J. F. O'CONNOR.
BOLT AND NUT LOCK.
APPLICATION FILED JULY 26, 1916.
1,253,709.
Patented Jan. 15, 1918.
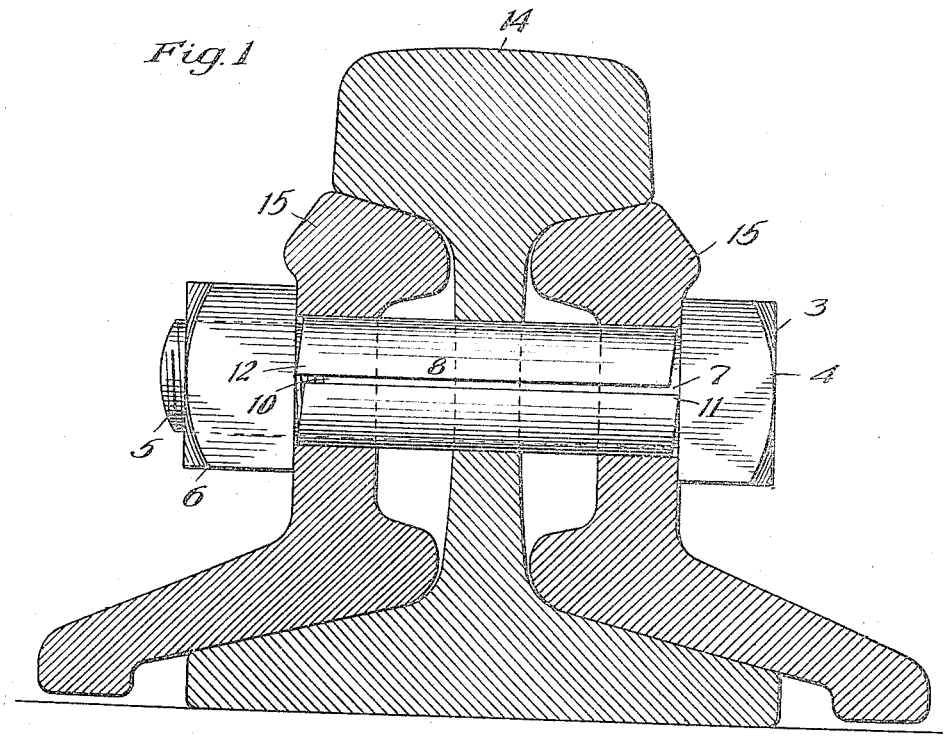
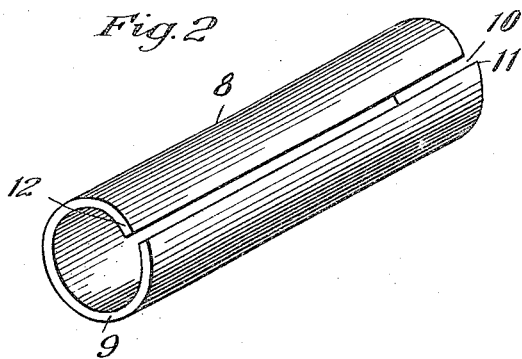
WITNESSES:
Wm. Geiger
Elizabeth M. Britt
INVENTOR.
John F. O'Connor
BY George I. Haight
his ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

BOLT AND NUT LOCK.

1,253,709.  Specification of Letters Patent.  Patented Jan. 15, 1918.

Application filed July 26, 1916. Serial No. 111,363.

*To all whom it may concern:*

Be it known that I, JOHN F. O'CONNOR, a citizen of the United States, residing at Chicago, in the county of Cook and State of Illinois, have invented a certain new and useful Improvement in Bolt and Nut Locks, of which the following is a full, clear, concise, and exact description, reference being had to the accompanying drawings, forming a part of this specification.

My invention relates to improvements upon bolt and nut locks.

The object of my invention is to provide an efficient means for locking a nut upon a bolt.

In the drawings forming a part of this specification, Figure 1 is a side elevation of a bolt and a nut, together with the lock embodying my invention, the same being mounted in connection with a railroad rail and fish plates, the rail and fish plates being shown in transverse section. Fig. 2 is a perspective view of the lock.

Referring to the drawings, the numeral 3 indicates a bolt having a head 4 at one end, and being threaded as at 5, at its other end, to receive a nut 6. The shank of the bolt 7 is provided with the nut lock 8, which consists of a plate of metal 9, formed in a general cylindrical shape; more specifically, the same is formed into a helix, the edges of the plate preferably being slightly spaced apart, as indicated at 10 in Fig. 2 of the drawings. On account of the helical formation, the greatest length of the lock is from the edge of the plate on one side of said groove, as at 11, to the edge of the plate on the other side of said groove 10 at the opposed ends of the lock, as at 12. The said lock is mounted upon the shank 7 of the bolt, between the nut 6 and the head 4. I have shown the same in Fig. 1 of the drawings as applied to a railroad rail connection, the rail being indicated at 14 and being provided at either side with the fish plates 15—15, all perforated for the passage of a bolt, adapted to hold the fish plates and rail together.

In the employment of my improved lock, the same is slipped upon the shank of the bolt and is entered through the perforations provided therefor, the said lock being formed of a sufficient length to extend somewhat from the openings in the members, to be held together, as for instance, the fish plates and rail. The nut is then threaded upon the bolt and upon being drawn home the point 12 of the lock will be engaged against the nut, and the point 11 against the bolt head, the said lock pressing outwardly upon the points 11 and 12 against the bolt and nut, respectively, and thus locking the nut against turning upon the bolt.

It will be understood that locks of this character, like the bolts upon which they are used, may be made of any suitable length and should be of such length that upon the drawing home of a nut upon a bolt, the lock, which is preferably made of spring-like material, will engage firmly at its points against the inner face of the nut at its one end and the inner face of the head at its other end. The nut lock will firmly hold a nut against rotation, whether said inner faces are smooth or corrugated, or otherwise roughened.

I claim:

1. The combination with a bolt, having a head and a screw nut, of a nut lock, comprising a cylinder of metal extending between the head and the nut, said cylinder being arranged to form a helix.

2. The combination with a bolt, having a head and a nut, comprising a plate of metal helically conformed to the bolt and engaging the inner face of the nut at one end and the bolt head at the other end.

3. As an article of manufacture, a nut lock for coöperation with bolts and nuts, said nut lock comprising a single coil formed from a spring plate, the coil being bent in the form of a helix and adapted to extend through the recess provided for the bolt, the ends of the nut lock being adapted to engage the under side of the bolt head and the under side of the coöperating nut.

In witness that I claim the foregoing I have hereunto subscribed my name this 22nd day of July, 1916.

JOHN F. O'CONNOR.

Witnesses:
 ELIZABETH M. BRITT,
 LUCILLE HIGGINS.

Copies of this patent may be obtained for five cents each, by addressing the "Commissioner of Patents, Washington, D. C."